US012327508B2

(12) United States Patent
Hu et al.

(10) Patent No.: US 12,327,508 B2
(45) Date of Patent: Jun. 10, 2025

(54) COMPENSATION METHOD AND COMPENSATION APPARATUS FOR DISPLAY PANEL, AND DISPLAY APPARATUS AND STORAGE MEDIUM

(71) Applicant: KUNSHAN GO-VISIONOX OPTO-ELECTRONICS CO., LTD, Jiangsu (CN)

(72) Inventors: Fengzhang Hu, Kunshan (CN); Junhui Lou, Kunshan (CN); Tao Tang, Kunshan (CN); Jinquan Zhang, Kunshan (CN)

(73) Assignee: KunShan Go-Visionox Opto-Electronics Co., Ltd., Kunshan (CN)

( * ) Notice: Subject to any disclaimer, the term of this patent is extended or adjusted under 35 U.S.C. 154(b) by 0 days.

(21) Appl. No.: 18/509,661

(22) Filed: Nov. 15, 2023

(65) Prior Publication Data

US 2024/0087495 A1 Mar. 14, 2024

Related U.S. Application Data

(63) Continuation of application No. PCT/CN2022/121961, filed on Sep. 28, 2022.

(30) Foreign Application Priority Data

Apr. 21, 2022 (CN) ......................... 202210427253.1

(51) Int. Cl.

| | |
|---|---|
| ***G09G 3/20*** | (2006.01) |
| ***G09G 3/3225*** | (2016.01) |
| ***G09G 3/36*** | (2006.01) |

(52) U.S. Cl.

CPC ......... *G09G 3/2007* (2013.01); *G09G 3/2092* (2013.01); *G09G 3/3225* (2013.01);

(Continued)

(58) Field of Classification Search

CPC ....... G09G 2320/045; G09G 2320/048; G09G 2320/046; G09G 2320/043;

(Continued)

(56) References Cited

U.S. PATENT DOCUMENTS

2014/0118426 A1* 5/2014 Chun ........................ G09G 3/20 345/691
2014/0168039 A1* 6/2014 Kim ..................... G09G 3/3208 345/82

(Continued)

FOREIGN PATENT DOCUMENTS

CN 110599943 A 12/2019
CN 111754935 A 10/2020

(Continued)

OTHER PUBLICATIONS

International Search Report issued on Dec. 12, 2022, in corresponding International Application No. PCT/CN2022/121961, 4 pages.

(Continued)

*Primary Examiner* — Dismery Mercedes
(74) *Attorney, Agent, or Firm* — Maier & Maier, PLLC

(57) ABSTRACT

A compensation method and compensation apparatus for a display panel, a display device and a storage medium. The method includes: with a first display grayscale of a first display region as a reference display grayscale, acquiring a second display grayscale of a second display region after a user adjusts the second display region; determining, according to the first display grayscale and the second display grayscale, a difference coefficient between the second display region and the first display region under a current use duration of the display panel; determining, according to the difference coefficient and a pre-stored display compensation curve of the second display region, a compensation start duration of the second display region, where the display compensation curve is a change curve of a relationship (Continued)

between a use duration of the second display region and a difference coefficient between the second display region and the first display region.

19 Claims, 5 Drawing Sheets

(52) U.S. Cl.
CPC ... *G09G 3/3607* (2013.01); *G09G 2320/0233* (2013.01); *G09G 2320/0242* (2013.01); *G09G 2320/0276* (2013.01); *G09G 2320/0626* (2013.01); *G09G 2320/0653* (2013.01); *G09G 2320/0673* (2013.01); *G09G 2320/0686* (2013.01); *G09G 2354/00* (2013.01); *G09G 2360/16* (2013.01)

(58) Field of Classification Search
CPC ....... G09G 2320/06; G09G 2320/0673; G09G 2320/0626; G09G 3/2003; G09G 3/2007; G09G 2360/16; G09G 2320/0271; G09G 2320/0233; G09G 2320/0242; G09G 2320/0276; G09G 2320/0686; G09G 3/20; G09G 3/3607; G09G 2320/0285; G09G 2320/0693; G09G 3/3666
See application file for complete search history.

(56) References Cited

U.S. PATENT DOCUMENTS

| | | | | |
|---|---|---|---|---|
| 2014/0306979 | A1 | 10/2014 | Chun et al. | |
| 2019/0114458 | A1* | 4/2019 | Cho | G06V 40/1306 |
| 2019/0130803 | A1* | 5/2019 | Zhang | G09G 3/006 |
| 2019/0279583 | A1* | 9/2019 | Shang | G09G 3/3611 |
| 2020/0258443 | A1* | 8/2020 | Xu | G09G 3/20 |
| 2020/0265779 | A1* | 8/2020 | In | G09G 3/3225 |
| 2020/0335028 | A1* | 10/2020 | Yang | G09G 3/2074 |
| 2021/0082373 | A1 | 3/2021 | Lou | |
| 2021/0327338 | A1* | 10/2021 | Park | G09G 3/3233 |
| 2022/0020306 | A1* | 1/2022 | Park | G09G 3/2007 |
| 2022/0328020 | A1* | 10/2022 | Tan | G09G 5/10 |
| 2023/0078888 | A1* | 3/2023 | Kim | G09G 3/3291<br>345/690 |

FOREIGN PATENT DOCUMENTS

| | | | | |
|---|---|---|---|---|
| CN | 111816112 | A | | 10/2020 |
| CN | 111866482 | A | | 10/2020 |
| CN | 111883058 | A | | 11/2020 |
| CN | 112116894 | A | | 12/2020 |
| CN | 112581903 | A | | 3/2021 |
| CN | 113628575 | A | | 11/2021 |
| CN | 113889016 | A | | 1/2022 |
| CN | 114120906 | A | * | 3/2022 |
| CN | 114333675 | A | | 4/2022 |
| CN | 114822351 | A | | 7/2022 |
| KR | 1020210129310 | A | | 10/2021 |
| WO | 2021043143 | A1 | | 3/2021 |

OTHER PUBLICATIONS

Office Action issued on Dec. 30, 2024, in corresponding Chinese Application No. 202210427253.1, 30 pages.
Extended Search Report issued on Apr. 1, 2025, in corresponding European Application No. 22938212.2, 13 pages.
Notice of Allowance issued on Mar. 28, 2025, in corresponding Korean Application No. 10-2023-7039209, 8 pages.

* cited by examiner

COMPENSATION METHOD AND COMPENSATION APPARATUS FOR DISPLAY PANEL, AND DISPLAY APPARATUS AND STORAGE MEDIUM

CROSS-REFERENCE TO RELATED APPLICATIONS

This application is a continuation of International Patent Application No. PCT/CN2022/121961, filed on Sep. 28, 2022, which claims priority to Chinese Patent Application No. 202210427253.1 filed on Apr. 21, 2022, disclosures of both of which are incorporated herein by reference in their entireties.

TECHNICAL FIELD

Embodiments of the present application relate to the field of display technology, for example, a compensation method and compensation apparatus for a display panel, a display device and a storage medium.

BACKGROUND

With the development of display technology, the requirements for the screen-to-body ratio of a display panel become increasingly higher, and full-screen display panel thus comes into being. The full-screen display panel generally includes a first display region and a second display region. The second display region has higher transmittance, and optical sensors such as cameras are disposed in the second display region.

The brightness difference between the first display region and the second display region of the full-screen display panel in the related art enlarges with the increase in the use time of the full-screen display panel, which affects the display effect.

SUMMARY

The present application provides a compensation method and compensation apparatus for a display panel, a display device and a storage medium to achieve better compensation for the brightness difference between a first display region and a second display region and improve the display effect.

In a first aspect, the embodiments of the present application provide a compensation method for a display panel. The compensation method is applied to display panels. The display panel includes a first display region and a second display region, and the transmittance of the second display region is different from the transmittance of the first display region.

The method includes the steps described below.

With a first display grayscale of the first display region as a reference display grayscale, a second display grayscale of the second display region after a user adjusts the second display region is acquired.

A difference coefficient between the second display region and the first display region under a current use duration of the display panel is determined according to the first display grayscale and the second display grayscale.

A compensation start duration of the second display region is determined according to the difference coefficient and a pre-stored display compensation curve of the second display region, where the display compensation curve is a change curve of a relationship between a use duration of the second display region and a difference coefficient between the second display region and the first display region.

The second display region is compensated from a current time according to a use duration of the display panel, the compensation start duration and the display compensation curve.

In a second aspect, the embodiments of the present application further provide a compensation apparatus for a display panel. The display panel includes a first display region and a second display region, and the transmittance of the second display region is different from the transmittance of the first display region.

The compensation apparatus for a display panel includes a grayscale acquisition module, a difference coefficient determination module, a compensation start duration determination module, and a compensation module.

The grayscale acquisition module is configured to, with a first display grayscale of the first display region as a reference display grayscale, acquire a second display grayscale of the second display region after a user adjusts the second display region.

The difference coefficient determination module is configured to determine, according to the first display grayscale and the second display grayscale, a difference coefficient between the second display region and the first display region under a current use duration of the display panel.

The compensation start duration determination module is configured to determine, according to the difference coefficient and a pre-stored display compensation curve of the second display region, a compensation start duration of the second display region, where the display compensation curve is a change curve of a relationship between a use duration of the second display region and a difference coefficient between the second display region and the first display region.

The compensation module is configured to compensate, according to the use duration of the second display region, the compensation start duration and the display compensation curve, the second display region from a current time.

In a third aspect, the embodiments of the present application further provide a display device. This display device includes a display panel and the compensation apparatus for a display panel described in any embodiment of the present application.

The display device further includes an optical sensor. The optical sensor is correspondingly disposed on a non-light emitting side of a second display region of the display panel.

In a fourth aspect, the embodiments of the present application further provide a computer-readable storage medium. The computer-readable storage medium is configured to store a computer program, and the computer program is used for, when executed by a processor, implementing the compensation method for a display panel described in any embodiment of the present application.

DETAILED DESCRIPTION

The present application is described below in detail in conjunction with the drawings and embodiments.

The brightness difference between the first display region and the second display region of the full-screen display panel in the related art enlarges with the increase in the use time of the full-screen display panel, which affects the display effect. The reason for the above-mentioned problem is that the aging degree of the first display region is different from the aging degree of the second display region with the increase in the use time of the display panel, thus enlarging the brightness difference between the first display region and the second display region with the increase in the use time, and since different display panels have different brightness differences between the first display region and the second display region, some compensation methods fail to better compensate for the brightness difference between the first display region and the second display region.

Figure 1:
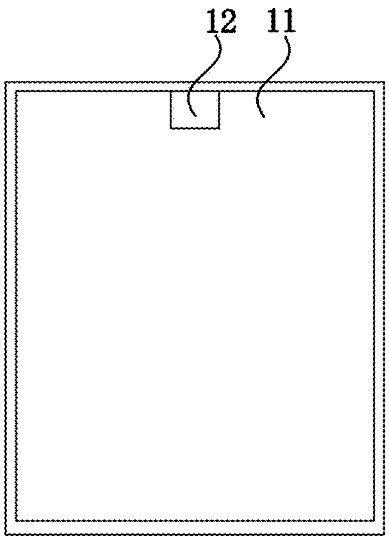
FIG. 1 is a view of a display panel according to an embodiment of the present application.

An embodiment of the present application provides a compensation method for a display panel. The compensation method is applied to display panels. FIG. 1 is a view of a display panel according to an embodiment of the present application. With reference to FIG. 1, the display panel includes a first display region 11 and a second display region 12, and the transmittance of the second display region 12 is different from the transmittance of the first display region 11.

The first display region 11 may be a main display region of the display panel, the second display region 12 is a transparent display region of the display panel, and both the first display region 11 and the second display region 12 can display pictures. Optionally, the transmittance of the second display region 12 may be greater than the transmittance of the first display region 11. An optical sensor may be correspondingly disposed on a non-light emitting side of the second display region 12, and the optical sensor includes an optical device such as a camera.

Figure 2:
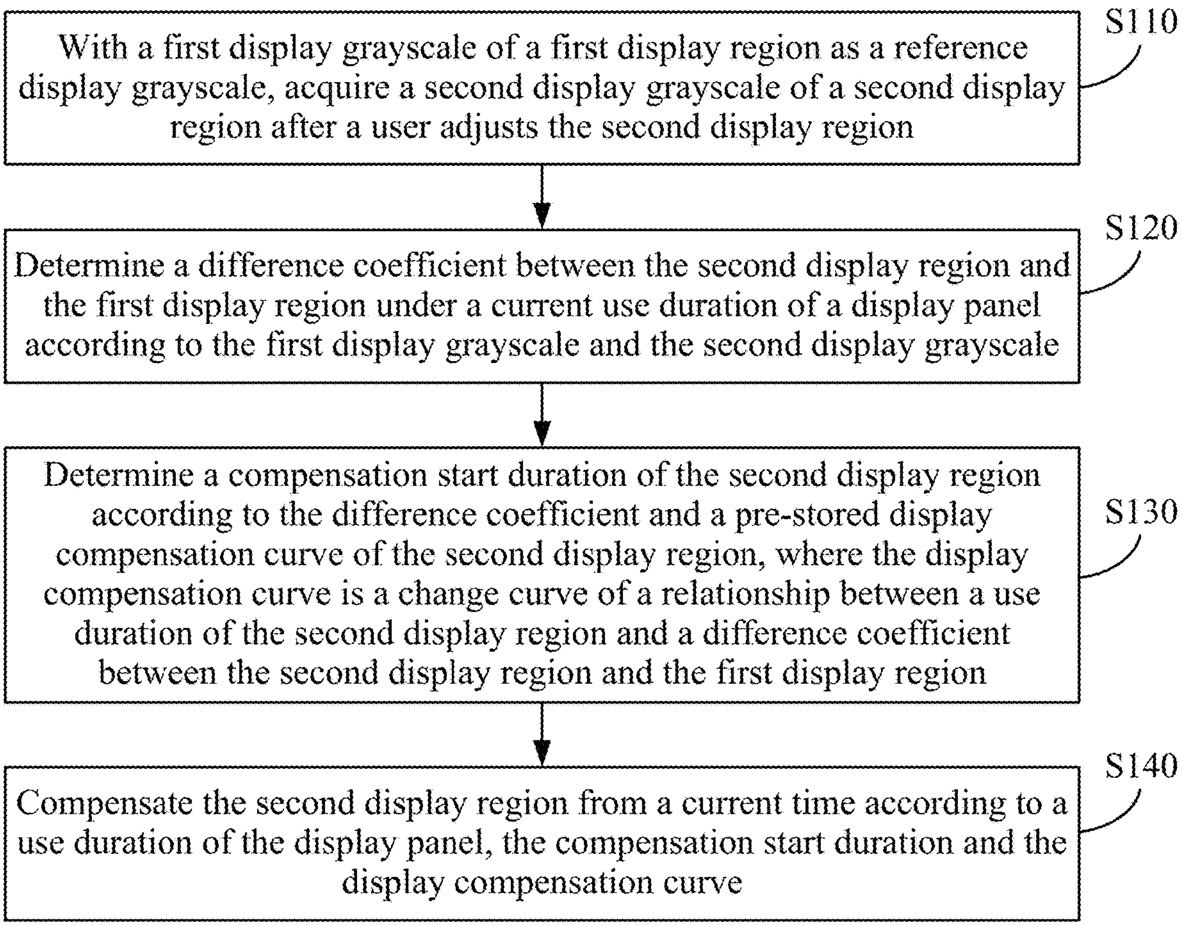
FIG. 2 is a flowchart of a compensation method for a display panel according to an embodiment of the present application.

FIG. 2 is a flowchart of a compensation method for a display panel according to an embodiment of the present application. With reference to FIG. 2, the compensation method includes S110 to S140 described below.

In S110, with a first display grayscale of the first display region as a reference display grayscale, a second display grayscale of the second display region after a user adjusts the second display region is acquired.

When the user is not satisfied with the display effect of the second display region during the use of the display panel, the user can manually adjust the display brightness and/or chrominance of the second display region. A brightness adjustment bar and a chrominance adjustment bar of the second display region are arranged in the display panel. The user can drag the brightness adjustment bar and the chrominance adjustment bar of the second display region to perform display adjustment on the second display region until the user is satisfied with the display effect of the second display region or the display effect of the second display region is consistent with the display effect of the first display region. The second display grayscale is the actual display grayscale of the second display region when the user stops the adjustment.

In addition, when a certain first display grayscale is displayed in the first display region of the display panel, the user can perform display adjustment on the display effect of the second display region, or when multiple different first display grayscales are displayed in the first display region respectively, the user can also perform display adjustment on the display effect of the second display region. For example, the user can adjust the display effect of the second display region with a certain high grayscale (for example, 245 grayscale) displayed in the first display region as a reference display grayscale, or the user can also adjust the display effect of the second display region with a certain low grayscale (for example, 80 grayscale) displayed in the first display region as a reference display grayscale. For example, when the first one of the first display grayscales is displayed in the first display region, the user can perform display adjustment on the second display region to obtain one set of a first display grayscale and a second display grayscale; when the second one of the first display grayscales is displayed in the first display region, the user can perform display adjustment on the second display region to obtain a second display grayscale corresponding to the second one of the first display grayscales; and so on, to complete display adjustment based on multiple different first display grayscales.

In S120, a difference coefficient between the second display region and the first display region under a current use duration of the display panel is determined according to the first display grayscale and the second display grayscale.

For example, the use duration is the cumulative duration when a manufactured display panel is on since the display panel is turned on for the first time. The current use duration is the cumulative duration when the display panel is on at the current time. The difference coefficient reflects the display difference between the first display region and the second display region at the current time. When the user performs display adjustment on the display effect of the second display region when multiple different first display grayscales are displayed in the first display region respectively, the second display grayscale corresponding to a respective one of the multiple different first display grayscales is obtained when the adjustment is completed, and multiple difference coefficients can be obtained according to the multiple different first display grayscales and the second display grayscale corresponding to a respective one of multiple different first display grayscales, respectively.

In S130, a compensation start duration of the second display region is determined according to the difference coefficient and a pre-stored display compensation curve of the second display region, where the display compensation curve is a change curve of a relationship between a use duration of the second display region and a difference coefficient between the second display region and the first display region.

In S140, the second display region is compensated from a current time according to a use duration of the display panel, the compensation start duration and the display compensation curve.

Figure 3:
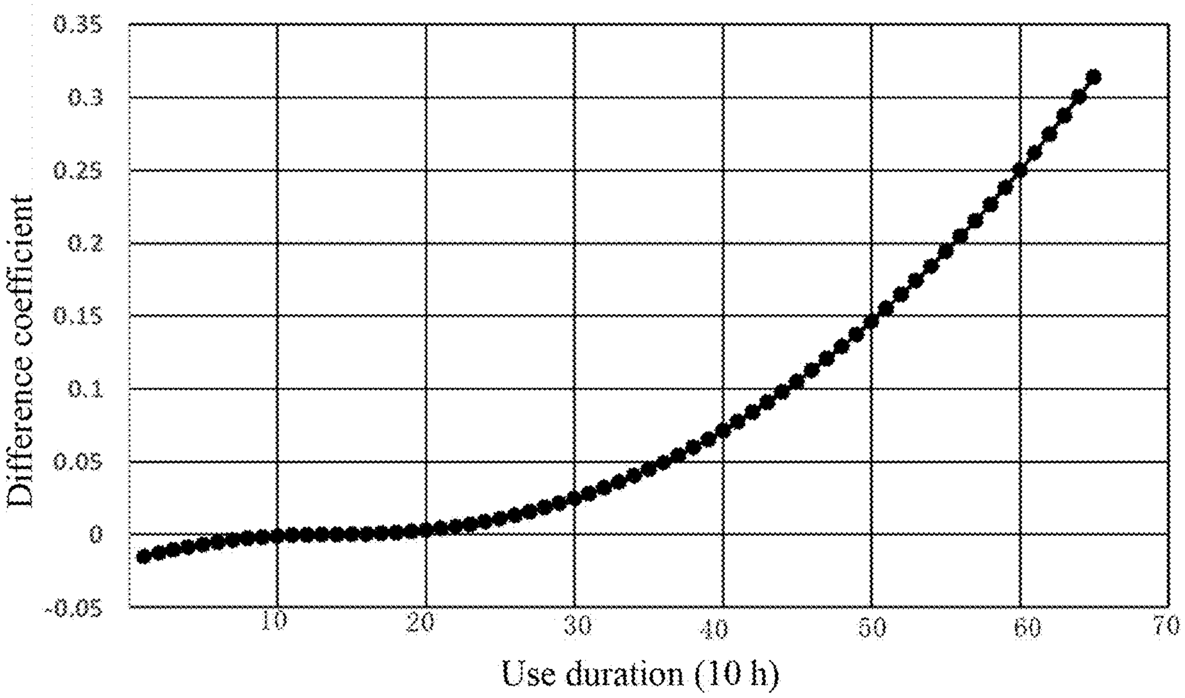
FIG. 3 is a graph of a display compensation curve according to an embodiment of the present application.

For example, FIG. 3 is a graph of a display compensation curve according to an embodiment of the present application. With reference to FIG. 3, the display compensation curve reflects the change in the difference coefficient between the second display region and the first display region with the increase in the use duration. Another display panel whose type is the same as the type of the display panel is tested to obtain the display compensation curve; or historical display data of another display panel whose type is the same as the type of the display panel may also be collected to obtain the display compensation curve according to the collected historical display data.

When the compensation start duration of the second display region is determined according to the difference coefficient and the pre-stored display compensation curve of the second display region, a use duration corresponding to the difference coefficient is looked for on the display compensation curve, and the use duration is determined to be the compensation start duration.

When the second display region is compensated from the current time according to the use duration of the display panel, the compensation start duration and the display compensation curve, the use duration of the second display region may be corrected according to the compensation start duration to obtain an actual equivalent use duration, a corresponding difference coefficient is looked for on the display compensation curve according to the actual equivalent use duration, and the second display region is compensated according to the corresponding difference coefficient. For example, a first difference value between the use duration of the display panel (a cumulative use duration of the display panel at any compensation time after the current time) and a current use duration corresponding to the current time may be calculated, the first difference value is summed with the compensation start duration to obtain an actual equivalent use duration, a difference coefficient corresponding to the actual equivalent use duration is looked for on the display compensation curve, and an actual display grayscale of the second display region is determined according to the difference coefficient corresponding to the actual equivalent use duration and a to-be-displayed grayscale of the second display region, where the difference value between the actual display grayscale of the second display region and the to-be-displayed grayscale is a compensation value of the second display region. Alternatively, a second difference value between the compensation start duration and a current use duration is determined, the use duration of the display panel is summed with the second difference value to obtain an actual equivalent use duration, a difference coefficient corresponding to the actual equivalent use duration is looked for on the display compensation curve, and an actual display grayscale of the second display region is determined according to the difference coefficient corresponding to the actual equivalent use duration and a to-be-displayed grayscale of the second display region.

When the second display region is compensated from the current time according to the use duration of the display panel, the compensation start duration and the display compensation curve, the use duration of the display panel may also be reset to zero from the current time, the use duration of the display panel starts to be re-timed, a location corresponding to the compensation start duration is determined to be a start compensation zero point, a corresponding difference coefficient is looked for on the display compensation curve according to the re-timed use duration each time compensating is performed, and the second display region is compensated according to the difference coefficient.

The display compensation curve may be pre-stored in the display panel when the display panel is manufactured, and the drive chip of the display panel compensates the second display region according to the display compensation curve. Since the aging degrees of the second display regions of different display panels are different with the increase in the use time, the second display region cannot be better compensated based on the display compensation curve with the increase in the use time, thus enlarging the display difference between the first display region and the second display region of the display panel.

In this embodiment, the compensation start duration is determined according to the difference coefficient between the second display region and the first display region at the current use duration and the display compensation curve, and the second display region is compensated from the current time according to the use duration of the display panel, the compensation start duration and the display compensation curve. Since the compensation start duration is determined according to the difference coefficient corresponding to the current use duration, the use duration of the display panel may be corrected using the compensation start duration so that the difference coefficient determined according to the display compensation curve is more consistent with the actual difference between the second display region and the first display region during the compensation, thereby better compensating the second display region, reducing the brightness difference between the first display region and the second display region and improving the display effect.

It is to be noted that a display compensation curve may be pre-stored in the display panel. When the user adjusts the display effect of the second display region only with a certain first display grayscale of the first display region as a reference display grayscale, one set of a first display grayscale and a second display grayscale is obtained, a difference coefficient is thus obtained, and a compensation start duration may be determined according to the difference coefficient and the display compensation curve. When the user adjusts the display effect of the second display region with multiple different first display grayscales of the first display region as reference display grayscales, multiple difference coefficients are obtained according to the different reference display grayscales, and multiple compensation start durations are determined according to the multiple difference coefficients and the display compensation curve. During the display of the display panel, a corresponding compensation start duration is selected according to a to-be-displayed grayscale of the display panel, and the second display region is compensated according to the corresponding compensation start duration and the display compensation curve.

Optionally, the step where the difference coefficient between the second display region and the first display region at the current use duration is determined according to the first display grayscale and the second display grayscale includes: difference coefficient=(second display grayscale−first display grayscale)/first display grayscale.

For example, both the first display grayscale and the second display grayscale may be a white image grayscale, that is, a comprehensive display grayscale of red sub-pixels, green sub-pixels and blue sub-pixels. After the brightness adjustment and chrominance adjustment are completed, the display grayscales of red sub-pixels, green sub-pixels and blue sub-pixels may be converted according to a chrominance formula to obtain a second display grayscale. The corresponding display compensation curve may be a white-grayscale compensation curve.

Both the first display grayscale and the second display grayscale may be monochrome sub-pixel display grayscale. For example, both the first display grayscale and the second display grayscale may be a red sub-pixel display grayscale, both the first display grayscale and the second display grayscale may be a green sub-pixel display grayscale, or both the first display grayscale and the second display grayscale may be a blue sub-pixel display grayscale.

Accordingly, the display compensation curve may be a monochrome compensation curve.

Figure 4:
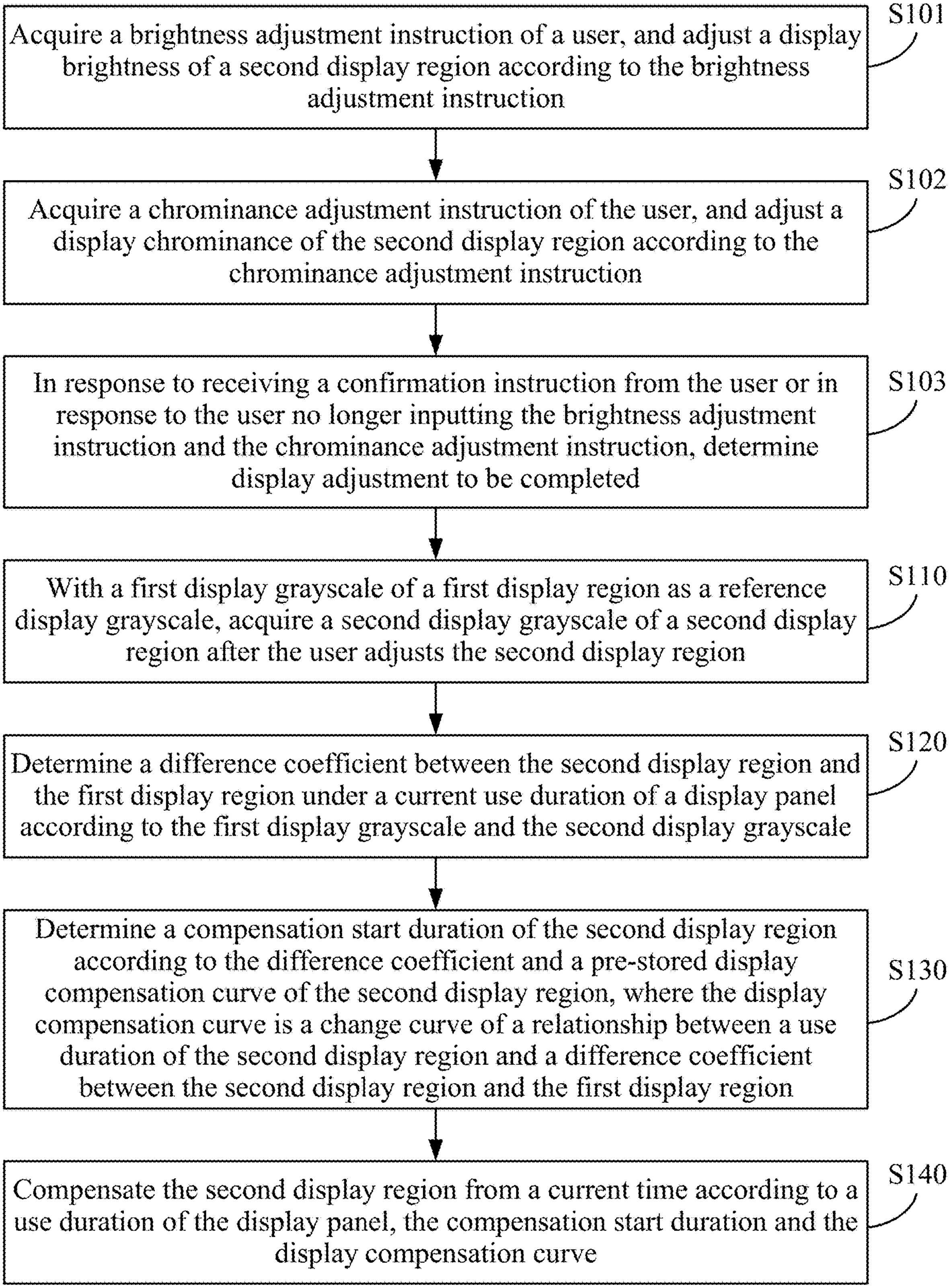
FIG. 4 is a flowchart of another compensation method for a display panel according to an embodiment of the present application.

Optionally, FIG. 4 is a flowchart of another compensation method for a display panel according to an embodiment of the present application. With reference to FIG. 4, the compensation method for a display panel includes S101 to S103 and S120 to S140 described below.

In S101, a brightness adjustment instruction of a user is acquired, and a display brightness of a second display region is adjusted according to the brightness adjustment instruction.

For example, a brightness adjustment bar may be arranged in the display panel. When the user drags the brightness adjustment bar, the display panel obtains a brightness adjustment instruction, and the display brightness of the second display region is adjusted according to a dragging amount. In addition, a brightness adjustment frame may also be arranged in the display panel. The user may input a grayscale value or a brightness value for adjustment, the display panel obtains a brightness adjustment instruction after the input is completed, and the display brightness of the second display region is adjusted according to the grayscale value or the brightness value.

In S102, a chrominance adjustment instruction of the user is acquired, and a display chrominance of the second display region is adjusted according to the chrominance adjustment instruction.

For example, a chrominance adjustment bar may be arranged in the display panel. When the user drags the chrominance adjustment bar, the display panel obtains a chrominance adjustment instruction, and the display chrominance of the second display region is adjusted according to a dragging amount. In addition, a chrominance adjustment frame may also be arranged in the display panel. The user may input a chrominance value or a grayscale value for adjustment, the display panel obtains a chrominance adjustment instruction after the input is completed, and the display chrominance of the second display region is adjusted according to the grayscale value or the chrominance value. It is to be noted that this embodiment only exemplarily illustrates several forms of adjusting chrominance and brightness and is not intended to limit the present application, and other adjustment modes may be adopted in other embodiments. In addition, in this embodiment, the user may choose to only adjust brightness, choose to only adjust chrominance or choose to simultaneously adjust chrominance and brightness according to needs. When the user only adjusts brightness, the display panel may only obtain a brightness adjustment instruction. When the user only adjusts chrominance, the display panel may only obtain a chrominance adjustment instruction. When the user simultaneously adjusts chrominance and brightness, the display panel may obtain both a chrominance adjustment instruction and a brightness adjustment instruction.

In S103, in response to receiving a confirmation instruction from the user or in response to the user no longer inputting the brightness adjustment instruction and the chrominance adjustment instruction, display adjustment is determined to be completed.

For example, when the user is satisfied with the display effects of both the first display region and the second display region, the brightness adjustment and the chrominance adjustment can be stopped. A confirmation button may be arranged on the display panel. The user clicks the confirmation button after the user completes the adjustment, the display panel receives a confirmation instruction, and the display adjustment is completed; or when the user no longer performs the brightness adjustment and the chrominance adjustment within a set time, it is confirmed that the display adjustment is completed.

In S110, with a first display grayscale of the first display region as a reference display grayscale, a second display grayscale of the second display region after the user adjusts the second display region is acquired.

In S120, a difference coefficient between the second display region and the first display region under a current use duration of the display panel is determined according to the first display grayscale and the second display grayscale.

In S130, a compensation start duration of the second display region is determined according to the difference coefficient and a pre-stored display compensation curve of the second display region, where the display compensation curve is a change curve of a relationship between a use duration of the second display region and a difference coefficient between the second display region and the first display region.

In S140, the second display region is compensated from a current time according to a use duration of the display panel, the compensation start duration and the display compensation curve.

In this embodiment, the user can perform display adjustment on the first display region and the second display region at any time according to needs, that is, the compensation start duration can be re-determined at any time, and the display effect of the display panel can be adjusted at any time. The operation process is simple, thereby improving the user experience.

Optionally, the step where the second display region is compensated from the current time according to the use duration of the display panel, the compensation start duration and the display compensation curve includes the following steps.

An actual difference coefficient between the second display region and the first display region corresponding to the use duration is determined according to the compensation start duration and the use duration of the display panel.

An actual display grayscale of the second display region is determined according to the actual difference coefficient and a to-be-displayed grayscale of the second display region.

The second display region is compensated according to the actual display grayscale.

For example, the to-be-displayed grayscale is a grayscale to be displayed in the second display region, and the actual display grayscale is a display grayscale displayed after the second display region is compensated. An actual equivalent use duration may be determined according to the compensation start duration and the use duration of the display panel, and an actual difference coefficient between the second display region and the first display region corresponding to the actual equivalent use duration is determined. In some embodiments, the use duration of the second display region may be corrected according to the compensation start duration to obtain an actual equivalent use duration, a corresponding difference coefficient is looked for on the display compensation curve according to the actual equivalent use duration to determine an actual difference coefficient, and an actual display grayscale of the second display region is calculated according to the actual difference coefficient and a to-be-displayed grayscale of the second display region.

Optionally, the step where the second display region is compensated according to the actual display grayscale includes the following step: a data drive signal or a light emission control signal of the second display region is adjusted according to the actual display grayscale.

For example, the data driving signal is a drive voltage signal written to a sub-pixel through a data line. A data drive signal of a to-be-compensated sub-pixel in the second display region may be directly adjusted according to the actual display grayscale so that the data drive signal of the to-be-compensated sub-pixel in the second display region is equal to a data drive signal of the actual display grayscale. In this manner, the to-be-compensated sub-pixel displays the brightness corresponding to the actual display grayscale, thereby reducing the display difference between the second display region and the first display region.

In addition, the light emission control signal is a signal inputted into a sub-pixel through a light emission control line. The light emission control signal is used for controlling a light emission duration of a sub-pixel. A light emission duration of each frame of a to-be-compensated sub-pixel may be adjusted by adjusting a duty cycle of the light emission control signal to adjust a display brightness of the to-be-compensated sub-pixel. In this manner, the to-be-compensated sub-pixel displays the brightness corresponding to the actual display grayscale, thereby reducing the display difference between the second display region and the first display region.

Optionally, the first display grayscale includes n first sub-display grayscales, n is a positive integer greater than or equal to 2, and a difference value between any two of the n first sub-display grayscales is greater than a set threshold. The step where with the first display grayscale of the first display region as the reference display grayscale, the second display grayscale of the second display region after the user adjusts the second display region is acquired includes the following step: with each first sub-display grayscale of the first display region as the reference display grayscale, a second sub-display grayscale of the second display region after the user adjusts the second display region is acquired, respectively.

The step where the difference coefficient between the second display region and the first display region under the current use duration of the display panel is determined according to the first display grayscale and the second display grayscale includes the following step: for each first sub-display grayscale, a first sub-difference coefficient between the second display region and the first display region corresponding to the first sub-display grayscale under the current use duration of the display panel is determined according to the first sub-display grayscale and the second sub-display grayscale corresponding to the first sub-display grayscale.

The step where the compensation start duration of the second display region is determined according to the difference coefficient and the pre-stored display compensation curve of the second display region includes the following step: for each first sub-display grayscale, a first sub-compensation start duration of the second display region corresponding to the first sub-display grayscale is determined according to the first sub-difference coefficient corresponding to the first sub-display grayscale and the pre-stored display compensation curve of the second display region.

The step where the second display region is compensated from the current time according to the use duration of the display panel, the compensation start duration and the display compensation curve includes the following step: the second display region is compensated from the current time according to a to-be-displayed grayscale, the use duration of the display panel, a first sub-compensation start duration corresponding to the to-be-displayed grayscale and the display compensation curve of the second display region.

For example, with a first first sub-display grayscale of the first display region as the reference display grayscale, a first second sub-display grayscale of the second display region after the user adjusts the second display region may be acquired; with a second first sub-display grayscale of the first display region as the reference display grayscale, a second second sub-display grayscale of the second display region after the user adjusts the second display region may be acquired; and so on until with an $n^{th}$ first sub-display grayscale of the first display region as the reference display grayscale, an $n^{th}$ second sub-display grayscale of the second display region after the user adjusts the second display region is acquired.

A first one of first sub-difference coefficients between the second display region and the first display region under the current use duration of the display panel is determined according to the first first sub-display grayscale and the first second sub-display grayscale; a second first sub-difference coefficient between the second display region and the first display region under the current use duration of the display panel is determined according to the second first sub-display grayscale and the second second sub-display grayscale; and so on until an $n^{th}$ first sub-difference coefficient between the second display region and the first display region under the current use duration of the display panel is determined according to the $n^{th}$ first sub-display grayscale and the $n^{th}$ second sub-display grayscale.

According to the first first difference coefficient, the second first difference coefficient, . . . , and the $n^{th}$ first difference coefficient and the pre-stored display compensation curve, n first sub-compensation start durations of the second display region are determined, respectively.

The first sub-compensation start duration corresponding to the to-be-displayed grayscale is a first sub-compensation start duration corresponding to a first sub-display grayscale that is the closest to the to-be-displayed grayscale. During the compensation, a difference value between the to-be-displayed grayscale and each first sub-display grayscale may be calculated to determine the first sub-display grayscale that is the closest to the to-be-displayed grayscale and thus determine the first sub-compensation start duration corresponding to the to-be-displayed grayscale. In addition, one grayscale range corresponding to each first sub-display grayscale may also be set, and during the compensation, a first sub-display grayscale corresponding to the to-be-displayed grayscale may be directly determined according to a grayscale range to which the to-be-displayed grayscale belongs to determine the first sub-compensation start duration corresponding to the to-be-displayed grayscale. After the first sub-compensation start duration corresponding to the to-be-displayed grayscale is determined, the use duration of the display panel is corrected according to the first sub-compensation start duration to obtain an actual equivalent use duration and thus compensate the second display region.

Since the display difference between the first display region and the second display region under different grayscales is different, at least two different first sub-display coefficients are obtained by performing display adjustment on the second display region with multiple different first sub-display grayscales of the first display region as the reference display grayscale. The at least two different first sub-difference coefficients reflect the display difference between the second display region and the first display region when the first display region displays corresponding first sub-display grayscales, respectively.

Only one display compensation curve may be set on the display panel, and a first sub-compensation start duration corresponding to each first sub-difference coefficient may be obtained according to each first sub-difference coefficient and the display compensation curve. A grayscale range in which a first sub-display grayscale corresponding to each first sub-compensation start duration is located is compensated according to the each first sub-compensation start duration. Since each first sub-difference coefficient can accurately reflect the display difference between the first display region and the second display region under a first sub-display grayscale corresponding to the each first sub-difference coefficient, a first sub-compensation start duration obtained through the each first sub-difference coefficient can better reflect an actual equivalent use duration of the second display region under the current use duration. The display difference between the first display region and the second display region within a grayscale range in which the first sub-display grayscale corresponding to the first sub-compensation start duration is located can be better compensated according to the display compensation curve and the actual equivalent use duration determined according to the first sub-compensation start duration and the use duration so than the second display region can be better compensated when different to-be-displayed grayscales are displayed in the second display region, thereby reducing the display difference between the first display region and the second display region and improving the display effect.

Optionally, the first display grayscale includes n first sub-display grayscales, and the step where with the first display grayscale of the first display region as the reference display grayscale, the second display grayscale of the second display region after the user adjusts the second display region is acquired includes the following step: with each first sub-display grayscale the first display region as the reference display grayscale, a second sub-display grayscale of the second display region after the user adjusts the second display region is acquired, respectively.

The step where the difference coefficient between the second display region and the first display region under the current use duration of the display panel is determined according to the first display grayscale and the second display grayscale includes the following step: for each first sub-display grayscale, a first sub-difference coefficient between the second display region and the first display region corresponding to the each first sub-display grayscale under the current use duration of the display panel is determined according to the first sub-display grayscale and the second sub-display grayscale corresponding to the first sub-display grayscale.

The step where the compensation start duration of the second display region is determined according to the difference coefficient and the pre-stored display compensation curve of the second display region includes the following step: the display panel includes m different display compensation curves, where one display compensation curve corresponds to at least one of the n first sub-display grayscales, and m is a positive integer less than or equal to n; for each first sub-display grayscale, a second sub-compensation start duration of the second display region corresponding to the first sub-display grayscale is determined according to the first sub-difference coefficient corresponding to the first sub-display grayscale and a display compensation curve corresponding to the first sub-display grayscale.

The step where the second display region is compensated from the current time according to the use duration of the display panel, the compensation start duration and the display compensation curve includes the following steps: a second sub-compensation start duration corresponding to a to-be-displayed grayscale of the second display region and a display compensation curve corresponding to the to-be-displayed grayscale are determined, and the second display region is compensated from the current time according to the use duration of the display panel, the to-be-displayed grayscale, the second sub-compensation start duration corresponding to the to-be-displayed grayscale and the display compensation curve corresponding to the to-be-displayed grayscale.

For example, each first sub-display grayscale may be set to correspond to one display compensation curve, and the grayscale range of the each first sub-display grayscale is compensated according to the display compensation curve. Since the aging difference between the second display region and the first display region in different grayscale ranges is different, the second display region can be better compensated by setting one corresponding display compensation curve for each first sub-display grayscale, that is, by setting one corresponding display compensation curve for each grayscale range. A corresponding second sub-compensation start duration is obtained using a first sub-difference coefficient corresponding to each first sub-display grayscale and a display compensation curve corresponding to the each first sub-display grayscale, and each grayscale in the grayscale range corresponding to the each first sub-display grayscale can be better compensated according to the corresponding second sub-compensation start duration and the display compensation curve so that the second display region can be better compensated when different to-be-displayed grayscales are displayed in the second display region, thereby reducing the difference between the first display region and the second display region and improving the display effect.

For example, during the compensation, a grayscale range in which a to-be-displayed grayscale (a grayscale to be displayed) of the second display region is located may be first determined, and a display compensation curve and a second sub-compensation start duration corresponding to the grayscale range may be determined according to the grayscale range. An actual difference coefficient between the second display region and the first display region is determined according to the second sub-compensation start duration corresponding to the grayscale range, the use duration and the display compensation curve corresponding to the grayscale range, and an actual display grayscale after the second display region is compensated may be obtained according to the actual difference coefficient and the to-be-displayed grayscale.

In addition, the aging difference between the first display region and the second display region in different grayscale is different, and the larger the grayscale difference, the more different the aging difference between the first display region and the second display region. For example, the difference coefficient between the first display region and the second display region when a first grayscale is displayed is a, the difference coefficient when a second grayscale is displayed is b, and the greater the difference value between the first grayscale and the second grayscale, the greater the difference value between a and b. In this embodiment, by setting the difference value between any two of n first sub-display grayscales to be greater than a set threshold, the grayscale ranges corresponding to the n first sub-display grayscales can be compensated respectively according to the display compensation curve and n second compensation start durations obtained by performing display adjustment on the second display region with the n first sub-display grayscales as the reference display grayscale, and targeted compensation can be performed on different grayscale ranges so that the difference between the second display region and the first display region can be better compensated, thereby improving the display effect.

Optionally, the display panel includes sub-pixels of at least three different emitted colors, each display compensation curve includes at least three different sub-display compensation curves, a sub-pixel of one emitted color corresponds to one sub-display compensation curve, and sub-pixels of different emitted colors correspond to different sub-display compensation curves. The step where the difference coefficient between the second display region and the first display region under the current use duration of the display panel is determined according to the first display grayscale and the second display grayscale includes the following step: for a sub-pixel of each emitted color, a second sub-difference coefficient between the second display region and the first display region corresponding to the sub-pixel of each emitted color under the current use duration of the display panel is determined according to the first display grayscale and the second display grayscale.

Both the first display grayscale and the second display grayscale may be white grayscales. At this point, grayscales of sub-pixels of each emitted color of the first display region and the second display region are obtained according to the first display grayscale, the second display grayscale and a chrominance formula, and according to the display grayscales of sub-pixels of the same emitted color of the first display region and the second display region, a second sub-difference coefficient of the emitted color is obtained. Both the first display grayscale and the second display grayscale may also be monochrome display grayscales. At this point, a second sub-difference coefficient between the first display region and the second display region corresponding to a sub-pixel pair of the emitted color may be directly obtained according to the first display grayscale and the second display grayscale.

The step where the compensation start duration of the second display region is determined according to the difference coefficient and the pre-stored display compensation curve of the second display region includes the following step: for a sub-pixel of each emitted color, a third sub-compensation start duration corresponding to the sub-pixel of the emitted color is determined according to the second sub-difference coefficient corresponding to the sub-pixel of the emitted color and a sub-display compensation curve corresponding to the sub-pixel of the emitted color.

The step where the second display region is compensated from the current time according to the use duration of the display panel, the compensation start duration and the display compensation curve includes the following step: for a sub-pixel of each emitted color, the sub-pixel of the emitted color of the second display region is compensated from the current time according to the use duration of the display panel, the third sub-compensation start duration corresponding to the sub-pixel of each emitted color and the sub-display compensation curve corresponding to the sub-pixel of each emitted color.

For example, the display panel may include red light-emitting sub-pixels, green light-emitting sub-pixels and blue light-emitting sub-pixels, and the display compensation curve may include a red sub-compensation curve, a green sub-compensation curve and a blue sub-compensation curve.

In this embodiment, a corresponding sub-display compensation curve is stored for a sub-pixel of each emitted color, a third sub-compensation start duration corresponding to the sub-pixel of the emitted color is determined according to a second sub-difference coefficient corresponding to the sub-pixel of the emitted color and the sub-display compensation curve corresponding to the sub-pixel of the emitted color, and for the sub-pixel of the emitted color, the sub-pixel of the emitted color of the second display region is compensated from the current time according to the use duration of the display panel, the third sub-compensation start duration corresponding to the sub-pixel of the emitted color and the sub-display compensation curve corresponding to the sub-pixel of the emitted color. In this manner, targeted compensation is performed on the sub-pixel of the emitted color, thereby reducing the display difference between the first display region and the second display region.

The embodiments of the present application further provide a compensation apparatus for a display panel. The display panel includes a first display region and a second display region, and the transmittance of the second display region is different from the transmittance of the first display region.

Figure 5:
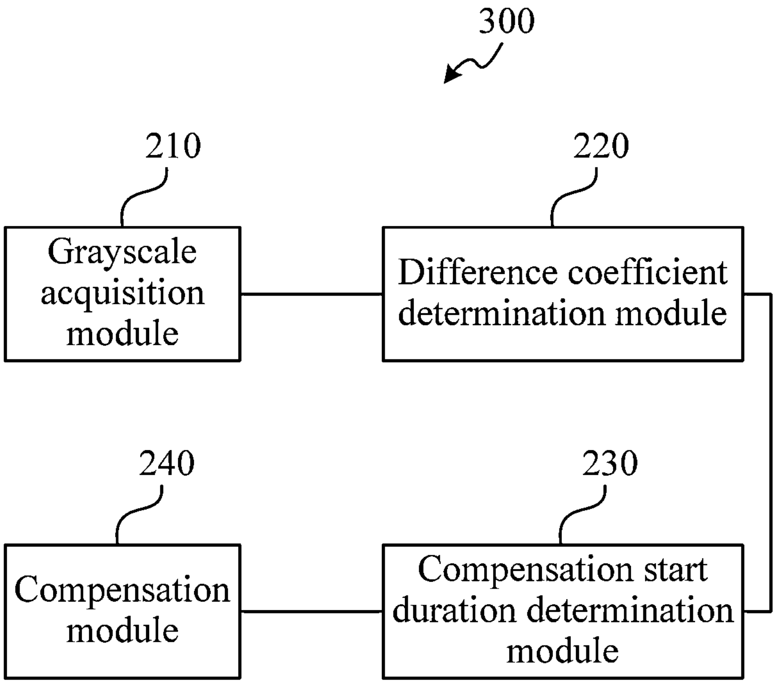
FIG. 5 is a schematic diagram of a compensation apparatus for a display panel according to an embodiment of the present application.

FIG. 5 is a schematic diagram of a compensation apparatus for a display panel according to an embodiment of the present application. With reference to FIG. 5, the compensation apparatus for a display panel includes a grayscale acquisition module 210, a difference coefficient determination module 220, a compensation start duration determination module 230, and a compensation module 240.

The grayscale acquisition module 210 is configured to, with a first display grayscale of the first display region as a reference display grayscale, acquire a second display grayscale of the second display region after a user adjusts the second display region.

The difference coefficient determination module 220 is configured to determine, according to the first display grayscale and the second display grayscale, a difference coefficient between the second display region and the first display region under a current use duration of the display panel.

The compensation start duration determination module 230 is configured to determine, according to the difference coefficient and a pre-stored display compensation curve of the second display region, a compensation start duration of the second display region, where the display compensation curve is a change curve of a relationship between a use duration of the second display region and a difference coefficient between the second display region and the first display region.

The compensation module 20 is configured to compensate, according to the use duration of the second display region, the compensation start duration and the display compensation curve, the second display region from a current time.

In an optional embodiment, the first display grayscale includes n first sub-display grayscales, n is a positive integer greater than or equal to 2, and a difference value between any two of the n first sub-display grayscales is greater than a set threshold. The grayscale acquisition module 210 is configured to, with each first sub-display grayscale of the first display region as the reference display grayscale, acquire a second sub-display grayscale of the second display region after the user adjusts the second display region, respectively. The difference coefficient determination module 220 is configured to, for each first sub-display grayscale among the n first sub-display grayscales, determine, according to the first sub-display grayscale and the second sub-display grayscale corresponding to the first sub-display grayscale, a first sub-difference coefficient between the second display region and the first display region corresponding to the first sub-display grayscale under the current use duration of the display panel. The compensation start duration determination module 230 is configured to, for each first sub-display grayscale among the n first sub-display grayscales, determine, according to the first sub-difference coefficient corresponding to the first sub-display grayscale and the pre-stored display compensation curve of the second display region, a first sub-compensation start duration of the second display region corresponding to the first sub-display grayscale. The compensation module 240 is configured to compensate, according to a to-be-displayed grayscale, the use duration of the display panel, a first sub-compensation start duration corresponding to the to-be-displayed gray scale and the display compensation curve of the second display region, the second display region from the current time.

In an optional embodiment, the first display grayscale includes n first sub-display grayscales, n is a positive integer greater than or equal to 2, and a difference value between any two of the n first sub-display grayscales is greater than a set threshold. The grayscale acquisition module 210 is configured to, with each first sub-display grayscale among the n first sub-display grayscales of the first display region as the reference display grayscale, acquire a second sub-display grayscale of the second display region after the user adjusts the second display region, respectively. The difference coefficient determination module 220 is configured to, for each first sub-display grayscale among the n first sub-display grayscales, determine, according to the first sub-display grayscale and the second sub-display grayscale corresponding to the each first sub-display grayscale, a first sub-difference coefficient between the second display region and the first display region corresponding to the each first sub-display grayscale under the current use duration of the display panel. The display panel includes m different display compensation curves, one display compensation curve corresponds to at least one first sub-display grayscale, and m is a positive integer less than or equal to n. The compensation start duration determination module 230 is configured to, for each first sub-display grayscale, determine, according to the first sub-difference coefficient corresponding to the first sub-display grayscale and a display compensation curve corresponding to the first sub-display grayscale, a second sub-compensation start duration of the second display region corresponding to the first sub-display grayscale. The compensation module 240 includes a duration and curve determination unit and a first compensation sub-unit. The duration and curve determination unit is configured to determine a second sub-compensation start duration corresponding to a to-be-displayed grayscale of the second display region and a display compensation curve corresponding to the to-be-displayed grayscale. The first compensation sub-unit is configured to compensate, according to the to-be-displayed grayscale, the use duration of the display panel, the second sub-compensation start duration corresponding to the to-be-displayed grayscale and the display compensation curve corresponding to the to-be-displayed grayscale, the second display region from the current time.

In an optional embodiment, difference coefficient=(second display grayscale−first display gray scale)/first display grayscale.

In an optional embodiment, the compensation apparatus further includes a brightness adjustment module, a chrominance adjustment module, and an adjustment completion determination module.

The brightness adjustment module is configured to acquire a brightness adjustment instruction of the user and adjust a display brightness of the second display region according to the brightness adjustment instruction.

The chrominance adjustment module is configured to acquire a chrominance adjustment instruction of the user and adjust a display chrominance of the second display region according to the chrominance adjustment instruction.

The adjustment completion determination module is configured to, in response to receiving a confirmation instruction from the user or in response to the user no longer inputting the brightness adjustment instruction and the chrominance adjustment instruction, determine display adjustment to be completed.

In an optional embodiment, the compensation module 240 includes an actual difference coefficient determination unit, an actual grayscale determination unit, and a second compensation sub-unit.

The actual difference coefficient determination unit is configured to determine, according to the compensation start duration and the use duration of the display panel, an actual difference coefficient between the second display region and the first display region corresponding to the use duration.

The actual grayscale determination unit is configured to determine, according to the actual difference coefficient and a to-be-displayed gray scale of the second display region, an actual display grayscale of the second display region.

The second compensation sub-unit is configured to adjust, according to the actual display grayscale, the second display region.

In an optional embodiment, the second compensation sub-unit is configured to adjust, according to the actual display gray scale, a data drive signal or a light emission control signal of the second display region.

In an optional embodiment, the display panel includes sub-pixels of at least three different emitted colors, each display compensation curve includes at least three different sub-display compensation curves, sub-pixels of one emitted color correspond to one sub-display compensation curve, and sub-pixels of different emitted colors correspond to different sub-display compensation curves.

The difference coefficient determination module 220 is configured to, for a sub-pixel of each emitted color, determine, according to the first display grayscale and the second display grayscale, a second sub-difference coefficient between the second display region and the first display region corresponding to the sub-pixel of the emitted color under the current use duration of the display panel. The compensation start duration determination module 230 is configured to, for a sub-pixel of the emitted color, determine, according to the second sub-difference coefficient corresponding to the sub-pixel of the emitted color and a sub-display compensation curve corresponding to the sub-pixel of the emitted color, a third sub-compensation start duration corresponding to the sub-pixel of the emitted color. The compensation module 240 is configured to, for a sub-pixel of each emitted color, compensate, according to the use duration of the display panel, the third sub-compensation start duration corresponding to the sub-pixel of the emitted color and the sub-display compensation curve corresponding to the sub-pixel of the emitted color, the sub-pixel of the emitted color of the second display region from the current time.

The compensation apparatus for a display panel provided in this embodiment of the present application and the compensation method for a display panel provided in any embodiment of the present application belong to the same inventive concept. For details not described in detail in this embodiment, reference may be made to the compensation method for a display panel provided in any embodiment of the present application.

Figure 6:
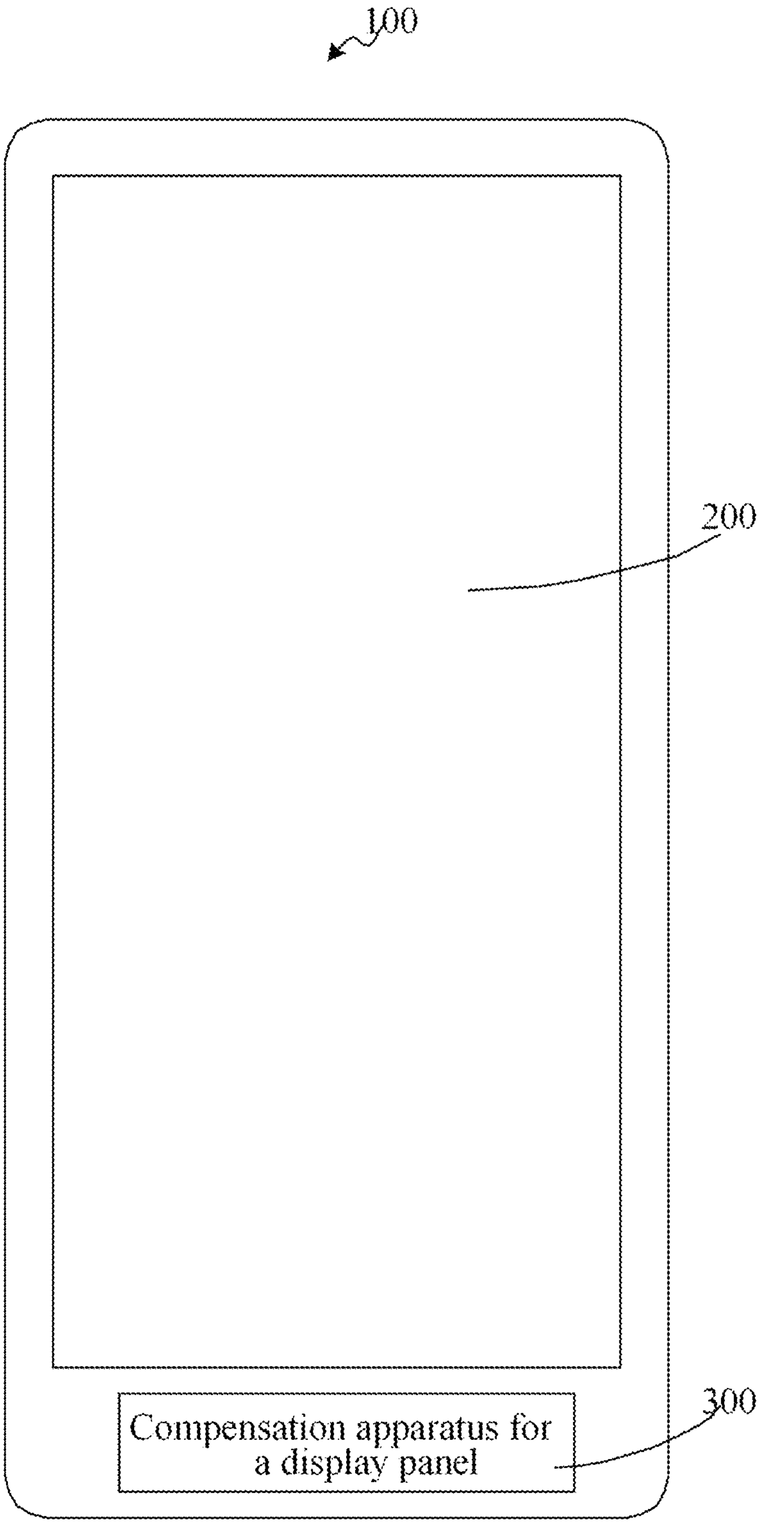
FIG. 6 is a schematic diagram of a display device according to an embodiment of the present application.

The embodiments of the present application further provide a display device. FIG. 6 is a schematic diagram of a display device according to an embodiment of the present application. With reference to FIG. 6, the display device 100 includes a display panel 200 and a compensation apparatus 300 for a display panel provided in any embodiment of the present application. The display device further includes an optical sensor. The optical sensor is correspondingly disposed on a non-light emitting side of a second display region of the display panel 200. The optical sensor includes a camera. The display device 100 may be a mobile phone and a tablet computer or another display device.

The embodiments of the present application further provide a computer-readable storage medium. The computer-readable storage medium is configured to store a computer program, and the computer program is used for, when executed by a processor, implementing the compensation method for a display panel provided in any embodiment of the present application.

What is claimed is:

1. A compensation method for a display panel, wherein the display panel comprises a first display region and a second display region, wherein a transmittance of the second display region is different from a transmittance of the first display region; and wherein the compensation method comprises:

with a first display grayscale of the first display region as a reference display grayscale, acquiring a second display grayscale of the second display region after a user adjusts the second display region;

determining, according to the first display grayscale and the second display grayscale, a difference coefficient between the second display region and the first display region under a current use duration of the display panel;

determining, according to the difference coefficient and a pre-stored display compensation curve of the second display region, a compensation start duration of the second display region; wherein the display compensation curve is a change curve of a relationship between a use duration of the second display region and a difference coefficient between the second display region and the first display region;

calculating the difference coefficient through (second display grayscale-first display grayscale)/first display grayscale, and compensating, according to a use duration of the display panel, the compensation start duration and the display compensation curve, the second display region from a current time.

2. The compensation method according to claim 1, before acquiring the second display grayscale of the second display region after the user adjusts the second display region with the first display grayscale of the first display region as the reference display grayscale, further comprising:

acquiring a brightness adjustment instruction of the user, and adjusting a display brightness of the second display region according to the brightness adjustment instruction;

acquiring a chrominance adjustment instruction of the user, and adjusting a display chrominance of the second display region according to the chrominance adjustment instruction; and in response to receiving a confirmation instruction from the user or in response to the user no longer inputting the brightness adjustment instruction and the chrominance adjustment instruction, determining display adjustment to be completed.

3. The compensation method according to claim 1, wherein determining, according to the difference coefficient and the pre-stored display compensation curve of the second display region, the compensation start duration of the second display region comprises:

looking for a use duration corresponding to the difference coefficient on the display compensation curve of the second display region, and determining the use duration to be the compensation start duration.

4. The compensation method according to claim 1, wherein compensating, according to the use duration of the display panel, the compensation start duration and the display compensation curve, the second display region from the current time comprises:

determining, according to the compensation start duration and the use duration of the display panel, an actual difference coefficient between the second display region and the first display region corresponding to the use duration;

determining, according to the actual difference coefficient and a to-be-displayed grayscale of the second display region, an actual display grayscale of the second display region; and adjusting, according to the actual display grayscale, a data drive signal or a light emission control signal of the second display region.

5. The compensation method according to claim 4, wherein determining, according to the compensation start duration and the use duration of the display panel, the actual difference coefficient between the second display region and the first display region corresponding to the use duration comprises:

determining, according to the compensation start duration and the use duration of the display panel, an actual equivalent use duration, and determining an actual difference coefficient between the second display region and the first display region corresponding to the actual equivalent use duration.

6. The compensation method according to claim 5, wherein determining, according to the compensation start duration and the use duration of the display panel, the actual equivalent use duration, and determining the actual difference coefficient between the second display region and the first display region corresponding to the actual equivalent use duration comprise:

correcting, according to the compensation start duration, the use duration of the display panel to obtain the actual equivalent use duration, looking for, according to the actual equivalent use duration, a difference coefficient corresponding to the actual equivalent use duration on the display compensation curve, and determining the difference coefficient corresponding to the actual equivalent use duration to be the actual difference coefficient.

7. The compensation method according to claim 6, wherein correcting, according to the compensation start duration, the use duration of the display panel to obtain the actual equivalent use duration comprises:

calculating a first difference value between a use duration of the display panel at any compensation time after the current time and a current use duration corresponding to the current time, and summing the first difference value with the compensation start duration to obtain the actual equivalent use duration.

8. The compensation method according to claim 6, wherein correcting, according to the compensation start duration, the use duration of the display panel to obtain the actual equivalent use duration comprises:

determining a second difference value between the compensation start duration and a current use duration, and summing a use duration of the display panel at any compensation time after the current time with the second difference value to obtain the actual equivalent use duration.

9. The compensation method according to claim 1, wherein compensating, according to the use duration of the display panel, the compensation start duration and the display compensation curve, the second display region from the current time comprises:

resetting the use duration of the display panel to zero from the current time, starting to re-time the use duration of the display panel, determining a location corresponding to the compensation start duration to be a start compensation zero point, looking for, according to the re-timed use duration, a corresponding difference coefficient on the display compensation curve each time compensating is performed, and compensating, according to the difference coefficient, the second display region.

10. The compensation method according to claim 1, wherein the first display grayscale comprises n first sub-display grayscales, n is a positive integer greater than or equal to 2, and a difference value between any two of the n first sub-display grayscales is greater than a set threshold;

wherein with the first display grayscale of the first display region as the reference display grayscale, acquiring the second display grayscale of the second display region after the user adjusts the second display region comprises:

with each first sub-display grayscale among the n first sub-display grayscales of the first display region as the reference display grayscale, acquiring a second sub-display grayscale of the second display region after the user adjusts the second display region, respectively;

wherein determining, according to the first display grayscale and the second display grayscale, the difference coefficient between the second display region and the first display region under the current use duration of the display panel comprises:

for each first sub-display grayscale among the n first sub-display grayscales, determining, according to the each first sub-display grayscale and the second sub-display grayscale corresponding to the each first sub-display grayscale, a first sub-difference coefficient between the second display region and the first display region corresponding to the each first sub-display grayscale under the current use duration of the display panel;

wherein determining, according to the difference coefficient and the pre-stored display compensation curve of the second display region, the compensation start duration of the second display region comprises:

for each first sub-display grayscale among the n first sub-display grayscales, determining, according to the first sub-difference coefficient corresponding to the each first sub-display grayscale and the pre-stored display compensation curve of the second display region, a first sub-compensation start duration of the second display region corresponding to the each first sub-display grayscale; and wherein compensating, according to the use duration of the display panel, the compensation start duration and the display compensation curve, the second display region from the current time comprises:

compensating, according to a to-be-displayed grayscale, the use duration of the display panel, a first sub-compensation start duration corresponding to the to-be-displayed grayscale and the display compensation curve, the second display region from the current time.

11. The compensation method according to claim 1, wherein the first display grayscale comprises n first sub-display grayscales, n is a positive integer greater than or equal to 2, and a difference value between any two of the n first sub-display grayscales is greater than a set threshold;

wherein with the first display grayscale of the first display region as the reference display grayscale, acquiring the second display grayscale of the second display region after the user adjusts the second display region comprises:

with each first sub-display grayscale among the n first sub-display grayscales of the first display region as the reference display grayscale, acquiring a second sub-display grayscale of the second display region after the user adjusts the second display region, respectively;

wherein determining, according to the first display grayscale and the second display grayscale, the difference coefficient between the second display region and the first display region under the current use duration of the display panel comprises:

for each first sub-display grayscale among the n first sub-display grayscales, determining, according to the each first sub-display grayscale and the second sub-display grayscale corresponding to the each first sub-display grayscale, a first sub-difference coefficient between the second display region and the first display region corresponding to the each first sub-display grayscale under the current use duration of the display panel;

wherein determining, according to the difference coefficient and the pre-stored display compensation curve of the second display region, the compensation start duration of the second display region comprises:

in a case where the display panel comprises m different display compensation curves, wherein one display compensation curve among the m different display compensation curves corresponds to at least one of the n first sub-display grayscales, and m is a positive integer less than or equal to n;

for each first sub-display grayscale among the n first sub-display grayscales, determining, according to the first sub-difference coefficient corresponding to the each first sub-display grayscale and a display compensation curve corresponding to the each first sub-display grayscale, a second sub-compensation start duration of the second display region corresponding to the each first sub-display grayscale; and wherein compensating, according to the use duration of the display panel, the compensation start duration and the display compensation curve, the second display region from the current time comprises:

determining a second sub-compensation start duration corresponding to a to-be-displayed grayscale of the second display region and a display compensation curve corresponding to the to-be-displayed grayscale; and compensating, according to the to-be-displayed grayscale, the use duration of the display panel, the second sub-compensation start duration corresponding to the to-be-displayed grayscale and the display compensation curve corresponding to the to-be-displayed grayscale, the second display region from the current time.

12. The compensation method according to claim 1, wherein the display panel comprises sub-pixels of at least three different emitted colors, the display compensation curve comprises at least three different sub-display compensation curves, a sub-pixel of one emitted color corresponds to one sub-display compensation curve, and sub-pixels of different emitted colors correspond to different sub-display compensation curves;

wherein determining, according to the first display grayscale and the second display grayscale, the difference coefficient between the second display region and the first display region under the current use duration of the display panel comprises:

for a sub-pixel of each emitted color, determining, according to the first display grayscale and the second display grayscale, a second sub-difference coefficient between the second display region and the first display region corresponding to the sub-pixel of each emitted color under the current use duration of the display panel;

wherein determining, according to the difference coefficient and the pre-stored display compensation curve of the second display region, the compensation start duration of the second display region comprises:

for a sub-pixel of each emitted color, determining, according to the second sub-difference coefficient corresponding to the sub-pixel of each emitted color and a sub-display compensation curve corresponding to the sub-pixel of each emitted color, a third sub-compensation start duration corresponding to the sub-pixel of each emitted color; and wherein compensating, according to the use duration of the display panel, the compensation start duration and the display compensation curve, the second display region from the current time comprises:

for a sub-pixel of each emitted color, compensating, according to the use duration of the display panel, the third sub-compensation start duration corresponding to the sub-pixel of each emitted color and the sub-display compensation curve corresponding to the sub-pixel of each emitted color, the sub-pixel of each emitted color of the second display region from the current time.

13. The compensation method according to claim 1, wherein the first display region is a main display region of the display panel, the second display region is a transparent display region of the display panel, and the first display region and the second display region are configured to display a picture.

14. The compensation method according to claim 1, wherein with the first display grayscale of the first display region as the reference display grayscale, acquiring the second display grayscale of the second display region after the user adjusts the second display region comprises:

in a case where one first display grayscale is displayed in the first display region of the display panel, performing display adjustment on a display effect of the second display region, or in a case where a plurality of different first display grayscales are displayed in the first display region of the display panel, performing display adjustment on a display effect of the second display region, respectively.

15. The compensation method according to claim 1, wherein the display compensation curve of the second display region is obtained in one of the following manners:

testing an other display panel whose type is the same as a type of the display panel to obtain the display compensation curve of the second display region; or collecting historical display data of an other display panel whose type is the same as a type of the display panel, and obtaining, according to the collected historical display data, the display compensation curve of the second display region.

16. A non-transitory computer-readable storage medium storing a computer program thereon, wherein the computer program is used for, when executed by a processor, implementing the compensation method for a display panel according to claim 1.

17. A compensation apparatus for a display panel with a processor, wherein the display panel comprises a first display region and a second display region, wherein a transmittance of the second display region is different from a transmittance of the first display region; and the compensation apparatus for the display panel comprises:

a grayscale acquisition module implemented on the processor configured to, with a first display grayscale of the first display region as a reference display grayscale, acquire a second display grayscale of the second display region after a user adjusts the second display region; a difference coefficient determination module implemented on the processor configured to determine, according to the first display grayscale and the second display grayscale, a difference coefficient between the second display region and the first display region under a current use duration of the display panel; and calculating the difference coefficient through (second display grayscale-first display grayscale)/first display grayscale;

a compensation start duration determination module implemented on the processor configured to determine, according to the difference coefficient and a pre-stored display compensation curve of the second display region, a compensation start duration of the second display region; wherein the display compensation curve is a change curve of a relationship between a use duration of the second display region and a difference coefficient between the second display region and the first display region; and a compensation module configured to compensate, according to the use duration of the second display region, the compensation start duration and the display compensation curve, the second display region from a current time.

18. The compensation apparatus for a display panel according to claim 17; and further comprising an optical sensor, wherein the optical sensor is correspondingly disposed on a non-light emitting side of a second display region of the display panel.

19. The display device according to claim 18, wherein the optical sensor comprises a camera.

* * * * *